C. A. FOX.
RESILIENT TIRE.
APPLICATION FILED JULY 28, 1909.
988,085.
Patented Mar. 28, 1911.
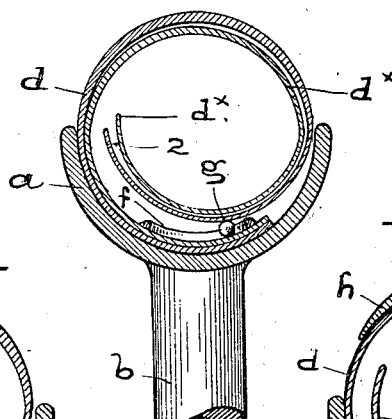
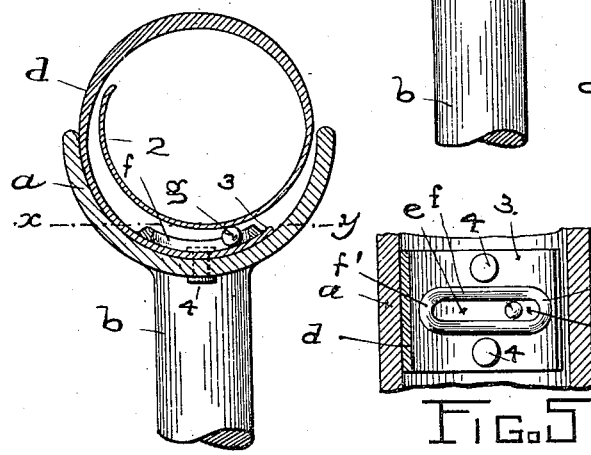
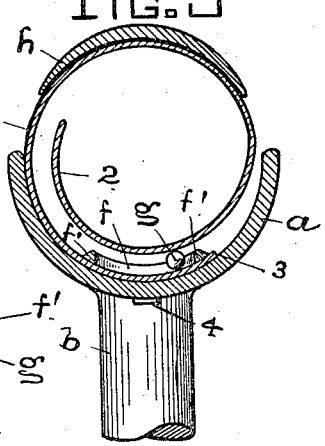
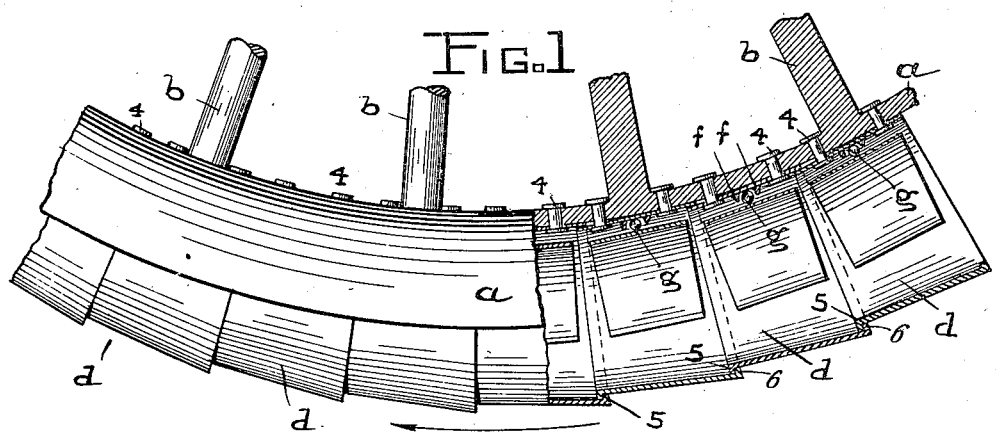
Witnesses:
Inventor
Charles Albert Fox
By E. E. Osborn
his Attorney

UNITED STATES PATENT OFFICE.

CHARLES ALBERT FOX, OF TAFT, CALIFORNIA.

RESILIENT TIRE.

988,085. Specification of Letters Patent. Patented Mar. 28, 1911.

Application filed July 28, 1909. Serial No. 509,963.

*To all whom it may concern:*

Be it known that I, CHARLES ALBERT FOX, a citizen of the United States, and a resident of Taft, in the county of Kern and State of California, have invented new and useful Improvements in Resilient Tires, of which the following is a specification.

This invention relates to improvements made in tires of that type or description in which metallic springs are employed in place of pneumatic tubes to obtain or impart the desired resiliency to the wheel.

The improvements embrace an all metal tire composed of sections or units formed of spiral springs of flat metal, a rim of concave shape in cross section in which the outer end or coil of each spirally formed section or unit is rigidly secured and antifriction bearings of peculiar and novel construction between the outer coil and the inner or adjacent coil.

The improvements embrace further a novel construction of tire in which the tire or that portion which comes in contact with the ground is composed of overlapping sections or units formed of flat metal bent to spiral form, and means for keeping the inner coil of the spiral out of rubbing contact with the outer coil and affording the required support for the inner spiral with a material reduction of the friction between the coils or turns of the spring.

The nature of the said improvements and the manner in which I proceed to apply, produce and carry out the same are explained at length in the following description, wherein reference is had to the accompanying drawings.

Figure 1 of the drawings illustrates the rim and tire of my invention, the same being a side-view with a portion of the rim and the tire units shown in section. Fig. 2 is a transverse section through the rim and tire illustrating the tire before it is subjected to compression. Fig. 3 is a similar transverse section in which the tire is provided with a protecting tread or shield to take the wear arising from contact with the ground. Fig. 4 is a similar view, representing a construction in which the tire unit is composed of two spiral sections lying one within the other. Fig. 5 is a longitudinal sectional view, the section being taken on the line $x$—$y$ of Fig. 2.

The rim $a$ is of any conventional type joined to the hub or center of the wheel by spokes $b$ of well known arrangement, excepting that the rim is somewhat deeper or of greater concavity than it is for a pneumatic tire wheel, in order to provide a rigid seat and an unyielding support for the spiral tire sections or units $d$. These last-named parts $d$ are composed each of a strip of flat tempered or spring metal coiled spirally upon itself in more than one complete turn, so that the inner end 2 overlaps the outer end 3. Between this outer turn or coil and the inner one, is provided a groove or recess $e$ with a standing rim $f$ or marginal edges confining in place between the inner and outer turns or coils a ball or roller $g$ as a rolling support or bearing for the spring, the recess that retains the ball in place being arranged longitudinally of the spring and curved to conform to the curvature of the rim in order to retain the ball in place and at the same time allow it to roll under the pressure of the spring. In the present construction the retaining means for the ball is a raised bead or rib fixed on the upper surface of the outer end 3 of the spring surrounding a relatively long and narrow recess, which is in width somewhat less than the diameter of the ball, so that the standing sides serve as a track for the ball and the standing ends $f'$ constitute ends to limit its length of travel.

A feature in the construction of the spring section or unit in this tire consists in forming the spring wider at the tread portion than at those portions which are not exposed to wear, and to furnish, besides, a sufficiently stiff tread not liable to become dented or bent in running over hard objects on the surface of the roadway; while the general resilient quality of the spring is secured and can be regulated to suit any special size or character of wheel, by varying the width of the inner coils as well as the weight of the metal used for the spring.

If the sections or units are fastened to the rim by bolts or screws, they can be detached and any one removed to make repairs with less work and loss of time than if they are riveted. In the present construction the spring units are secured to the rim by two rivets 4 passing through the outer end 3 of each spring and the rim. Each spring unit is fitted into and is overlapped by the next unit behind as seen in Fig. 1, and the underlying edge of each spring is formed or provided with a bead or flange 5 and the overlapping portion with a bead 6 for the purpose chiefly of securing a close joint that will to a great extent or degree exclude dirt and foreign particles and also prevent the springs from separating from one another with the effect of destroying the overlapping arrangement. The play or sliding movement of one unit upon the other by contact with the ground and compression under the weight of the load tends to make the joints between the units self cleaning.

The strip from which the spring unit is formed should taper from about the middle toward both ends, so that when coiled with more than one complete turn to bring the free inner end over the fixed outer end the broadened middle portion will lie on the circumference and come in contact with the ground. The free inner end is also usually reduced in width over the opposite end for the purpose of obtaining greater resiliency in the smaller turn or coil of the spring that is necessarily subjected to relatively greater contraction and expansion than the larger coil or turn, and the resilient quality of the spring is varied by increasing the thickness of the metal strip and by varying the width of the tapered portions as well. The width of the strips are regulated and governed also by the size or circumference of the rim to which the spring units are attached, increasing with the circumference and otherwise so proportioned that they will telescope and constantly overlap or engage one with another under all changes in angular position in the revolutions of the wheel. To overcome the wear due to contact with the ground the tread or broad portion of the spring is increased in thickness as shown in Figs. 1 and 2. Or the modification illustrated in Fig. 3 may be employed instead, the same consisting of a surrounding rim or tire $h$ of metal of concave form in cross section encircling the spring tire.

The object of using a deep rim as illustrated in Figs. 2, 3 and 4 is to protect the tire units on the sides from being bent or indented and to check excessive compression under a sudden jar or an increase in the load that might break or destroy the efficiency of the springs that are sustaining the weight. The edges of the rim being brought in contact with the ground at such moment serve to check further compression and prevent accidents, while under normal working compression they remain clear of the ground. For the purpose of securing greater stiffness of the tire under heavy loads, an auxiliary spring $d^x$ is arranged within the spring $d$. The spring $d^x$ is attached to the rim by the same fastening means as are used for the main spring $d$, and is arranged to lie within and out of contact with the spring $d$ under normal conditions.

I claim:—

1. The combination with a wheel rim, of a resilient tire composed of spirally coiled spring units telescopically joined one to another, the outer end of each spring being secured to the wheel rim, and the inner or smallest end being unattached and freely contractible under compression of the spring, and an anti-friction bearing interposed between the outer and inner coils comprising a loosely confined ball and a track adapted to confine and limit the linear movement of the ball.

2. A resilient tire vehicle wheel comprising a continuous rim, spirally coiled spring units mounted thereon all around the circumference, the said coiled springs being disposed transversely of the rim and securely fastened thereto at the outer ends of the coiled springs, the springs being arranged telescopically and provided with beads on the upper face on one side and on the lower face on the other side to engage similar beads on the next adjacent spring to prevent the springs from separating, the inner end of the coil being unattached and a ball interposed between the outer and inner coils and a guide on the outer coil adapted to confine the motion of the ball to a direction transverse of the rim.

CHARLES ALBERT FOX.

Witnesses:
RICHARD NOWISH,
C. F. SELLERS.